US012657392B2

(12) United States Patent
Joshi et al.

(10) Patent No.: US 12,657,392 B2
(45) Date of Patent: Jun. 16, 2026

(54) EXTRACTING THEMES FROM TEXTUAL DATA

(71) Applicant: AMERICAN EXPRESS TRAVEL RELATED SERVICES COMPANY, INC., New York, NY (US)

(72) Inventors: Salil Rajeev Joshi, Bangalore (IN); Aayush Sacheti, Rajasthan (IN); Minnie Kabra, Rajasthan (IN); Abhishek Jha, Haryana (IN); Abhinav Nagpal, Haryana (IN)

(73) Assignee: American Express Travel Related Services Company, Inc., New York, NY (US)

( * ) Notice: Subject to any disclaimer, the term of this patent is extended or adjusted under 35 U.S.C. 154(b) by 122 days.

(21) Appl. No.: 18/524,857

(22) Filed: Nov. 30, 2023

(65) Prior Publication Data

US 2025/0181834 A1     Jun. 5, 2025

(51) Int. Cl.
*G06F 40/30*          (2020.01)
*G06F 16/358*        (2025.01)
*G06F 40/232*        (2020.01)
*G06F 40/289*        (2020.01)

(52) U.S. Cl.
CPC ............ *G06F 40/30* (2020.01); *G06F 16/358* (2019.01); *G06F 40/232* (2020.01); *G06F 40/289* (2020.01)

(58) Field of Classification Search
CPC ...... G06F 40/30; G06F 16/358; G06F 40/232; G06F 40/289
See application file for complete search history.

(56) References Cited

U.S. PATENT DOCUMENTS

| | | | |
|---|---|---|---|
| 10,896,428 B1 * | 1/2021 | Balasubramaniam | ...................... G10L 15/1815 |
| 2011/0202836 A1 * | 8/2011 | Badger | ................. G06F 40/274 715/825 |
| 2017/0235820 A1 * | 8/2017 | Conrad | ................. G06F 40/295 707/728 |
| 2017/0270123 A1 * | 9/2017 | Jhamtani | ............. G06F 16/4393 |
| 2018/0107643 A1 * | 4/2018 | Gliozzo | ................ G06F 40/232 |
| 2018/0150582 A1 * | 5/2018 | Lepercq | ................ G06F 30/392 |
| 2020/0356633 A1 * | 11/2020 | Garlapati | .............. G06F 16/287 |
| 2021/0089620 A1 * | 3/2021 | Finkelshtein | ......... G06F 40/216 |
| 2021/0326526 A1 * | 10/2021 | Yee | ........................ G16H 10/20 |

(Continued)

*Primary Examiner* — Darioush Agahi
(74) *Attorney, Agent, or Firm* — Sterne, Kessler, Goldstein & Fox P.L.L.C.

(57) ABSTRACT

Disclosed herein are apparatus, system, method, and computer-readable medium aspects for extracting themes from textual data. Textual data is initially cleansed from its submitted form into a simplified form for improved accuracy of topic extraction. From the cleansed text, phrases are extracted. Embeddings of the phrases are then determined so that similarities can be identified between different phrases within the text. Using these embodiments, clustering is performed on the embeddings to reveal the topics included within the text submission, as well as their frequency and relationship to one another. This clustering processing can be repeated at multiple levels of granularity for improved accuracy. Based on an analysis of the resulting clusters, a graphical representation of the clusters at the various levels is generated to provide an easy-to-understand indication of the body of text and the topics and themes included therein.

19 Claims, 10 Drawing Sheets

(56) References Cited

U.S. PATENT DOCUMENTS

| | | | |
|---|---|---|---|
| 2022/0215167 A1* | 7/2022 | Rajpathak | G06N 5/01 |
| 2023/0267926 A1* | 8/2023 | Padfield | G10L 15/22 |
| | | | 704/235 |
| 2024/0078559 A1* | 3/2024 | Anderson | G06F 40/35 |
| 2024/0160651 A1* | 5/2024 | Bhattacharjee | G06F 16/3344 |
| 2025/0124255 A1* | 4/2025 | Bergner | G06N 3/0475 |
| 2025/0156487 A1* | 5/2025 | Nguyen | H04M 3/5238 |

* cited by examiner

800

900

EXTRACTING THEMES FROM TEXTUAL DATA

BACKGROUND

Field

Aspects of the present disclosure relate to components, systems, and methods for extracting themes from textual data.

Background

Companies receive large amounts of textual data related to customer service interactions. This textual data can reflect, for example, a conversation between a customer service representative and a customer (e.g., an audio transcript, manually-entered notes from the customer service representative, etc.), a conversation between a chatbot and a customer (e.g., a transcript of the chat, etc.), or a conversation between a customer service representative and a merchant. Despite gathering this large set of data, it can be extremely time-consuming to manually review these customer interactions. Further, analytics related to this data are sparse and it is often difficult to obtain or generate such analytics.

BRIEF SUMMARY

Disclosed herein are system, apparatus, device, method and/or computer program product embodiments, and/or combinations and sub-combinations thereof, for extracting themes from textual data and generating a visualization of text themes.

In an aspect, a text processing system is disclosed that includes a memory that stores a text submission and one or more processors configured to receive the text submission from the memory, cleanse the text submission into a simplified form, extract one or more phrases from the cleansed text submission, cluster the extracted phrases into a plurality of different clusters wherein the plurality of different clusters form a hierarchy of themes extracted from the text submission, label the plurality of different clusters to generate a plurality of labeled clusters, and generate a graphical representation that visualizes the plurality of labeled clusters organized in the hierarchy.

In an aspect, the cleansing includes detecting a language of the received text submission.

In an aspect, the cleansing includes at least one of removing non-ASCII characters, expanding contractions, removing numbers, removing multiple spaces, removing names and punctuation, removing stopwords, and lemmatizing the text submission.

In an aspect, the cleansing includes expanding abbreviations and shorthand expressions.

In an aspect, the cleansing includes: detecting erroneously split words, merging the erroneously split words, detecting erroneously combined words, and separating the erroneously combined words.

In an aspect, the cleansing includes spell checking the received text submission.

In an aspect, wherein the spell checking includes: detecting a misspelled word in the text submission, creating a wordlist of correct English words within a first predetermined edit distance of the misspelled word, generating a plurality of candidates for the misspelled word within a second edit distance from the misspelled word, filtering the plurality of candidates based on whether the plurality of candidates are present in the text submission and based on historical data, and selecting the correct word from the plurality of candidates based on a frequency of use of the plurality of candidates in the text submission and a Jaro Winkler distance from the misspelled word.

In an aspect, a text processing system is disclosed that includes a memory that stores a text submission, an image output device configured to provide a graphical representation of the processed text to a user, and one or more processors configured to: receive the text submission from the memory, extract one or more phrases from the text submission, cluster the extracted phrases into a plurality of different clusters, and generate the graphic representation based on the plurality of labeled clusters.

In an aspect, the one or more processors are further configured to label the plurality of different clusters.

In an aspect, the clustering includes determining an embedding representation of sentences within a summary of the text submission.

In an aspect, the embedding representation is a vector that encodes a meaning of a word, phrase, or sentence in such a way that other embeddings that are closer in the vector space are expected to be similar in meaning.

In an aspect, the clustering further includes performing Kmeans clustering on all phrases included within the text submission to produce K level-0 clusters associated with the text submission.

In an aspect, the clustering further includes modified community detection that includes: determining similar sentence communities, and removing overlapping communities.

In an aspect, similar sentence communities are identified based on a cosine similarity of multiple embeddings identified in the text submission, and wherein the removal of overlapping communities removes a smaller overlapping community in favor of a larger overlapping community.

In an aspect, a method is disclosed that includes storing a text submission, cleansing the text submission, extracting one or more phrases from the cleansed text submission, clustering the extracted phrases into a plurality of different clusters, labeling the plurality of different clusters, and generating a graphic representation of the different clusters based on the plurality of labeled clusters.

In an aspect, the method further includes spellchecking the text submission.

In an aspect, the spellchecking includes: detecting a misspelled word in the text submission, creating a wordlist of correct English words within a first predetermined edit distance of the misspelled word, generating a plurality of candidates for the misspelled word within a second edit distance from the misspelled word, filtering the plurality of candidates based on whether the plurality of candidates are present in the text submission and based on historical data, and selecting the correct word from the plurality of candidates based on a frequency of use of the plurality of candidates in the text submission and a Jaro Winkler distance from the misspelled word.

In an aspect, the clustering includes determining an embedding representation of sentences within a summary of the text submission, the embedding representation being a vector that encodes a meaning of a word, phrase, or sentence in such a way that other embeddings that are closer in the vector space are expected to be similar in meaning.

In an aspect, the clustering further includes performing Kmeans clustering on all phrases included within the text submission to produce K level-0 clusters associated with the text submission.

In an aspect, the clustering further includes, for each of a preset number of top level-0 clusters, performing a second clustering operation to arrive at a plurality of level-1 clusters.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Disclosed herein are system, apparatus, device, method and/or computer program product embodiments, and/or combinations and sub-combinations thereof, for extracting themes from textual data and generating a visualization of text themes.

In some embodiments, a text processing system may analyze textual data to extracting corresponding themes and to generate a graphical user interface visualization of the text themes. The text processing system may analyze large volumes of unstructured textual data across wide range of categories. For example, this may include call transcripts, feedback data, complaint data, notes, chats, and/or other sources of data. The text processing system may analyze this textual data to extract potential root causes of issues or complaints and/or common themes that may emerge among different segments of the large volume of textual data. The The text processing system may then generate a graphical user interface visualization to present the extracted themes for a user to easily view. These themes may be visually represented by clusters. The clusters may be formed and visualized with relative sizes to that a user viewing the graphical user interface is able to gauge the relative prevalence of particular themes. The visualization may also provide a hierarchical layering of different cluster information as well.

To extract and visualize themes from the textual data, the textual data may be cleansed from its submitted form into a simplified form for improved accuracy of topic extraction. From the cleansed text, phrases are extracted. Embeddings of the phrases are then determined so that similarities can be identified between different phrases within the text. Using these embodiments, clustering is performed on the embeddings to reveal the topics included within the text submission, as well as their frequency and relationship to one another. This clustering processing can be repeated at multiple levels of granularity for improved accuracy. Based on an analysis of the resulting clusters, a graphical representation of the clusters at the various levels is generated to provide an easy-to-understand indication of the body of text and the topics and themes included therein. This graphical user interface further provides a visualization of the themes extracted from a large volume of textual data.

Various embodiments of these features will now be discussed with respect to the corresponding figures.

Figure 1:
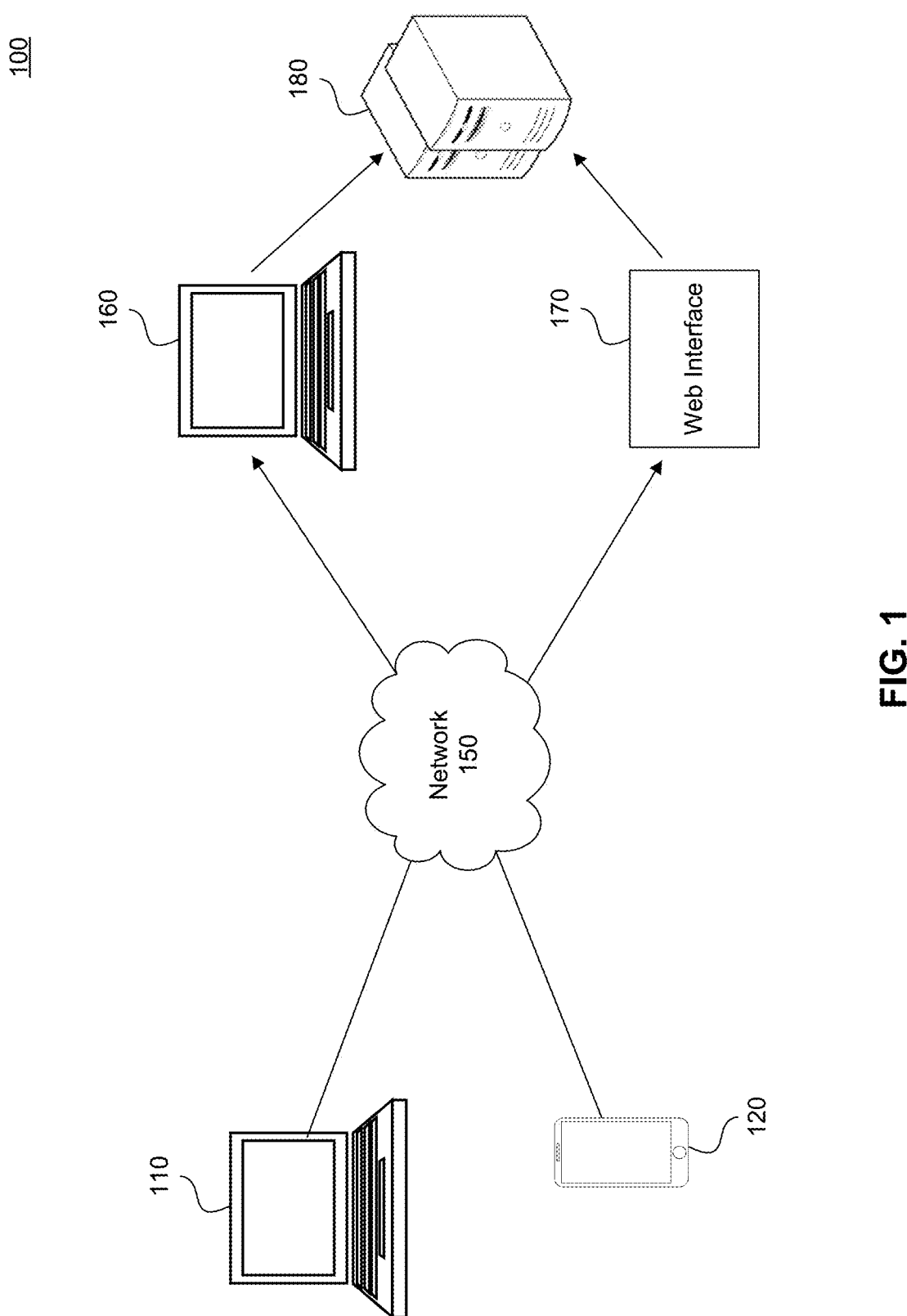
FIG. 1 illustrates a block diagram of an exemplary text analysis environment according to embodiments of the present disclosure.

FIG. 1 illustrates a block diagram of an exemplary text analysis environment 100 according to embodiments of the present disclosure. As shown in FIG. 1, the environment 100 includes one or more user devices 110/120, an agent terminal 160, a web interface 170, and one or more backend servers 180. As shown in FIG. 1, the user devices 110/120 communicate with the agent terminal 160 or web interface 170 via a network 150.

In an embodiment, the user device 110 includes a personal computer, laptop computer or other personal computing device capable of communicating with one or more of the web interface 170 or agent at agent terminal 160 via the network 150. User device 120, on the other hand, may include any suitable portable or handheld device capable over communication with one or more of the agent at agent terminal 160 or web interface 170, and may include a smartphone, personal digital assistant, tablet computer, gaming device, etc.

As discussed above, the user devices 110/120 communicate with the backend devices over the network 150. In embodiments, the network 150 may include any suitable communication network or combination of communication networks, including but not limited to 4G, 5G, WLAN, POTS, etc., and may include wired and/or wireless networks. The network 150 is responsible for transferring data communications between the user devices 110/120 and the agent terminal 160 or web interface 170. In an embodiment, the user devices 110/120 communicate over the network 150 using any suitable communication protocol, including but not limited to Internet Protocol, HTTP, TCP, etc.

In an embodiment, the agent terminal 160 is any suitable electronic device capable of communicating with one or more of the user devices 110/120 over the network, and allowing for an agent using the agent terminal 160 to assist or communicate with the customer. Meanwhile, the web interface 170 is a webpage or other Internet-accessible user interface that the customer, using one of the user devices 110 or 120 can access and submit feedback, requests, questions, or other inputs. In some embodiments, the user may access a customer portal or other customer interface via an app running on one of the user device 110 or 120.

In an embodiment, customer feedback received at either the agent terminal 160 and/or the web interface 170 (or any other suitable feedback mechanism not shown herein) is provided to the backend server 180 for text processing, as will be discussed in further detail below. For example, a text processing system may be implemented using one or more backend servers 180, databases, and/or computer system 1000 as described with reference to FIG. 10 to perform the text processing described herein.

In operation, a customer using one of the user devices 110 or 120 communicates with one of the agent terminal 160 or web interface 170. During that communication, the customer may provide certain feedback (e.g., questions, comments, complaints, etc.). For example, when communicating with the agent via the agent terminal 160, this feedback may come in the form of speech audio. The agent terminal 160 or some other intermediary records the speech audio for future reference, and may also convert the speech audio to a text-based format. Meanwhile, if the user communicates with the web interface 170, then the user may enter feedback into a form field in a text format. This feedback is also recorded. In an embodiment, all feedback received from a customer via all different communications means is stored in a database (not shown) for future reference and analysis.

At some point, after feedback has been received, the backend server 180 and/or the text processing system performs a series of operations on the received feedback data in order to summarize the feedback and identify phrases included within the feedback, as will be described in further detail below. This information can then be provided to one or more administrators to fine-tune customer service responses, address customer feedback directly, or modify systems used by the customers.

Figure 2:
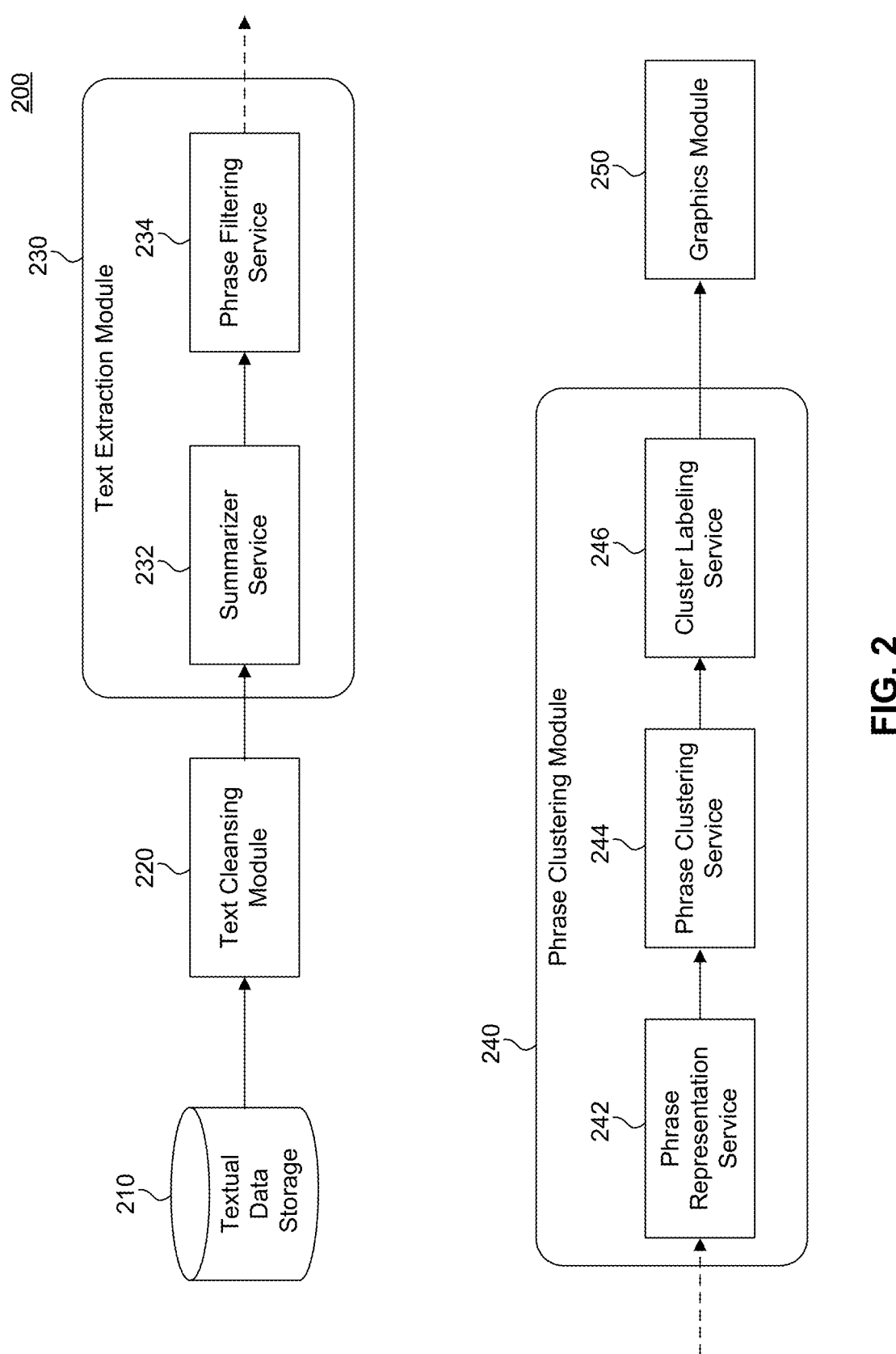
FIG. 2 is a block diagram of a text processing system for extracting themes from textual data, according to some aspects of the present disclosure.

FIG. 2 is a block diagram of a text processing system 200 for extracting themes from textual data, according to some aspects of the present disclosure. In an embodiment, text processing system 200 includes a textual data storage 210, a text cleansing module 220, a text extraction module 230, a phrase clustering module 240, and a graphics module 250.

In embodiments, textual data storage 210 can store textual data related to customer service interactions. Textual data storage 210 can store audio transcripts or manually-entered notes from a call between a merchant and a customer. In an example, textual data storage 210 can store noisy text, such as manually entered notes that include grammatical errors, spelling mistakes, abbreviations, or other textual errors. In another example, textual data storage 210 can store noise noisy text, such as audio-based transcripts having wrongly detected words, background noise, or missing sentence boundaries.

In embodiments, textual data storage 210 can store structured or unstructured textual data. Textual data storage 210 can be or include one or more servers, services, databases, and/or a combination thereof. Textual data storage 210 can be a database management system (DBMS). Textual data storage 210 can be a secure store. Textual data storage 210 can be located at a single location or multiple locations. Textual data storage 210 can be implemented on a server computer, virtual machine, container, cloud-computing platform, or other device. Textual data storage 210 can be implemented on a desktop computer, laptop, tablet, smartphone, server, database, or other digital storage device.

In embodiments, text cleansing module 220 can perform text simplification and cleansing on textual data from textual data storage 210. Text cleansing module 220 can be configured to perform a single processing step or multiple processing steps to simplify and cleanse textual data from textual data storage 210. For example, text cleansing module 220 can be configured to detect a language of a textual data; to remove non-America Standard Code for Information Interchange (ASCII) characters from a textual data; to expand textual shorthand or contractions in a textual data; to clarify ambiguous abbreviations in a textual data; to merge words in a textual data that have an incorrect space between them; to split words in a textual data that lack a correct space between them; to correct misspelled words in a textual data; to merge synonyms or similar words in a textual data together; to convert textual data to its lemmatized form; to remove uniform resource locators, mail identifications, punctuation, stopwords, HyperText Markup Language tags, and other identifiers from textual data; to remove vowels from words in a textual data; and to replace names or dates in a textual data with digital tokens.

In an aspect where a language of a textual data is detected, a compact language detection library based on a probabilistic classifier can be used. For example, Google's cld2 library configured to be based on a Naïve Bayes classifier can be used. In an aspect where non-ASCII characters are removed from a textual data, a function can be used to check a standard character encoding of the characters. For example, the Unicode encoding standard can be used.

In an aspect where textual shorthand or contractions in a textual data are expanded, a dictionary can be used to find the correct expansion. In aspects involving customer services interactions of an entity, dictionaries internal to the entity can be used too. For example, an entity may have an internal dictionary that indicates that "CM" is the shorthand for "card member." This internal dictionary can be used when analyzing the textual data.

In an aspect where misspelled words in a textual data are corrected, a spellchecking service can be used. A spellchecking service can be configured to perform several operations to correct misspelled words. First, a spellchecking service can create a wordlist of correctly spelled words in the language of the textual data. The wordlist can be generated by an entity, or a python based wordlist, such as that available through Natural Language Toolkit, can be used. Then, possible misspelled words can be identified based on the wordlist. For each identified word, a set of words can be generated that are within a threshold edit distance from the identified word. The set of words can be filtered based on whether they are present in the textual data or other related data. Lastly, a correctly spelt word can be selected from the set of words based on either the frequency in which the correctly spelt word appears in the textual data or a string metric measuring an edit distance between two sequences, such as a Jaro-Winkler distance.

In an aspect where synonyms or similar words in a textual data are merged together, a natural language processing service can be used. The natural language processing service can include a lexical database, such as WordNet, which identifies words, senses, and the semantic relationship between the words and the senses. The natural language processing service can also take advantage of part-of-speech tagging, where words in textual data are marked for a particular part of speech based on its definition and context. For example, for each unique word in the textual data, synonyms can be found for the word using the lexical database, where the synonyms can be required to have the same part-of-speech tag as the word in the textual data. The synonyms can be ranked based on a natural language processing score and a frequency in which they occur in the textual data to obtain a list of words. Then, a natural language processing model can obtain word embeddings for each of the words in the list and calculate the cosine distance from the original word in the textual data. For example, FinBERT, a pre-trained natural language processing model can be used to analyze the sentiment of the textual data. If the cosine distance between a word in the list and the original word in the textual data is greater than a threshold number, such as 0.7, than the words can be merged.

In an aspect where vowels are removed from words in a textual data, a disemvoweling service can be used. The disemvoweling service can remove vowels (e.g., converting "cars" to "crs") to quicken processing of textual data. The disemvoweling service can be configured to first remove vowels from a list of correctly spelled words, either from historical data or through another wordlist. Words that have the same disemvoweled forms are then removed from this process, to avoid confusion. For example, because "card" and "cord" have the same disemvoweled form of "crd", no disemvoweled form would be generated for these words. Using the disembovweled word list, vowels in the textual data can be removed.

The text cleansing module 220 can be configured to perform other operations that simplify and cleanse textual data. Text cleansing module 220 can be or include one or more servers, services, databases, and/or a combination thereof. Text cleansing module 220 can be implemented on a server computer, virtual machine, container, cloud-computing platform, or other device. Text cleansing module 220 can be implemented on a desktop computer, laptop, tablet, smartphone, or other device. These and other aspects of the text cleansing module 220 will be described in further detail below.

In embodiments, text extraction module 230 can extract portions of textual data considered most related to the theme or major topic areas of the overall textual data. In other words, text extraction module 230 can filter through a mixture of themes and redundant information to focus on the theme of the textual data. Text extraction module 230 can be or include one or more servers, services, databases, and/or a combination thereof. For example, text extraction module 230 can include a summarizer service 232 and a phrase filtering service 234. In embodiments, text extraction module 230 can be implemented on a server computer, virtual machine, container, cloud-computing platform, or other device. In embodiments, text extraction module 230 can be implemented on a desktop computer, laptop, tablet, smartphone, or other device. These and other aspects of the text extraction module 230 will be described in further detail below.

In embodiments, summarizer service 232 can be a natural language processing service configured to produce a summary of text (e.g., a simplified text) using content within the textual data. In an embodiment, summarizer service 232 can use a neural network when producing the summary. In some aspects, a sequence-to-sequence and encoder-decoder transformer model can be used with the neural network. For example, a pre-trained bidirectional autoregressive transformer (BART) neural network architecture can be used to extract relevant portions of text from the textual data. The BART neural network architecture can be trained using a dataset of input textual data and manually identified portions of the textual data that summarize the overall data, such that the neural network learns to identify portions of textual data as most relevant to a theme of the textual data. In an aspect, a bidirectional encoder can analyze context from either side of a word within the textual data. In an aspect, an autoregressive decoder can be used to generate text, such that the text generated depends on the previously generated word. An autoregressive decoder uses information from previous time steps of the decoder to generate the value at a current time step. Summarizer service 232 can also be configured to, based on the output of a neural network, split portions of textual data into smaller portions. Summarizer service 232 can split the portions using conjunctions, or a threshold number of words.

In embodiments, phrase filtering service 234 can be applied to the output of summarizer service 232 to further extract portions of the summary of textual data. Phrase filtering service 234 can be configured to extract only the best quality sentences for further processing in text processing system 200. In an embodiment, phrase filtering service 234 first computes a sentiment score, using sentiment analysis, of sentences and phrases from the summary of textual data from summarizer service 232. For example, a pre-trained language representation model, such as a bidirectional encoder representations from transformers (BERT) or DistilBERT language model, can be used to understand the sentiment of text using surrounding text. For example, the language model can analyze phrases within the summary of textual data to identify high positive sentiments (e.g., "I am happy"). These high positive sentiments phrases can be eliminated from or emphasized in the summary of textual data. In some aspects, the language model can be configured to extract portions of the summary of textual data relevant to an entity owning or controlling text processing system 200. For example, if text processing system 200 is relevant to a financial services company, a phrase irrelevant to a financial services company (e.g., "the weather is great") can be eliminated from the summary of textual data. In an embodiment, phrase filtering service 234 can also be configured with a density-based spatial clustering of applications with noise (DBSCAN) algorithm to identify outlier sentences within the summary of textual data. Sentences identified as outliers can be those outside of a distribution or exceeding a threshold distance from other phrases or sentences in a semantic space representing the summary of textual data. Phrase filtering service 234, using sentiment analysis, can also eliminate phrases or sentences having highly related meanings, to avoid repetitive information in further processing of text processing system 200.

In embodiments, phrase clustering module 240 can categorize and label the summary of textual data such that themes can be extracted. Phrase clustering module 240 can be or include one or more servers, services, databases, and/or a combination thereof. For example, phrase clustering module 240 can include a phrase representation service 242, a phrase clustering service 244, and a cluster labeling service 246. Phrase clustering module 240 can be implemented on a server computer, virtual machine, container, cloud-computing platform, or other device. In an embodiment, phrase clustering module 240 can be implemented on a desktop computer, laptop, tablet, smartphone, or other device. These and other aspects of the phrase clustering module 240 will be described in further detail below.

Phrase representation service 242 can include a sentence transformer model configured to determine an embedding representation of sentences within the summary of textual data from text extraction module 230. An embedding representation can be a vector that encodes the meaning of a word, phrase, or sentence in such a way that other embeddings that are closer in the vector space are expected to be similar in meaning. First, a phrase from the summary of textual data and its associated sentence can be provided to a tokenizer of the sentence transformer model to give context to the phrase. The sentence transformer model can then extract an embedding of the complete sentence. However, only the embedding related to the phrase is considered for further processing. Normalization and a principal component analysis can then be performed on the phrase by phrase representation service 242 to reduce the embedding dimensions.

Once phrase representation service 242 has determined an embedding representation related to a phrase, certain features (e.g., words, stopwords, entity specific words, redundant words) can be mathematically suppressed or boosted. In an aspect involving a suppression mechanism, the embedding representation of a feature of interest can be multiplied by a factor less than one and the embedding representation of the overall phrase can be multiplied by a factor greater than one, as to maintain the sum of the embeddings. In an aspect involving a boosting mechanism, the embedding representation of a feature of interest can be multiplied by a factor greater than one and the embedding representation of the overall phrase can be multiplied by a factor less than one, as to maintain the sum of the embeddings.

Phrase clustering service 244 can be configured to provide a level-wise clustering of the embedding representations from phrase representation service 242, such that similar sentences are categorized together. Phrase clustering service 244 can be configured to perform at least two clustering algorithms, where a subsequent clustering algorithm uses outputs from the previous clustering algorithm as input, such that cluster size shrinks as processing continues. Each clustering algorithm can correspond to a level in a vertical hierarchy, such that the highest level of the hierarchy includes the largest cluster size and the lowest level of the hierarchy includes the smallest cluster size.

In an aspect, phrase clustering service 244 can perform a first clustering algorithm that is a method of vector quantization for grouping embedding representations that are similar to one another. For example, the first clustering algorithm can be a k-means algorithm that partitions sentences from the embedding representations into clusters, where each sentence belongs to the cluster with the nearest mean (i.e., cluster centroid). In this aspect, the number of clusters can be determined as a function of the initial number of customer service interactions for an entity.

In aspects, phrase clustering service 244 can use the k-clusters from the first clustering algorithm as inputs when performing a second clustering algorithm. The second clustering algorithm can be a community detection algorithm, such that each k-cluster can be partitioned into an additional layer of clusters. For example, similar sentence communities within a k-cluster can be determined based on a cosine similarity of pairwise combinations of the embedding representations within the k-cluster. A similarity threshold, such as a linear function, can be used to establish upper and lower limit thresholds for a new cluster. To eliminate redundancy in the process, overlapping sentence communities can be removed, biasing the size of each sentence community. Additionally, the analysis can be limited to sentence communities larger than a minimum threshold. This will produce one or more sentence communities (e.g., clusters) for each k-cluster. This community detection algorithm can be repeated, using the one or more sentence communities as inputs, outputting additional similar sentence communities (e.g., clusters) for each sentence community input. Accordingly, a hierarchy can be formed where an input text forms the highest level and, as k-means algorithms are processed, a level of parent clusters is formed. Then, as community detection algorithms are processed, child clusters are formed off each parent cluster. Because each cluster represents similar sentences from a summary of textual data, and because each cluster falls at a different level in the hierarchy, themes of varying levels of detail can be identified for each cluster.

Cluster labeling service 246 can provide labels for the themes of each cluster identified by the phrase clustering service 244. Labels for each cluster can be determined by first determining a sentence, within the respective cluster, that falls closest to the centroid of the cluster. The centroid is the multi-dimensional average (e.g., middle) of the cluster. Then, the textual data within the cluster can be analyzed to determine which phrases are closest to the sentence closest to the centroid.

In some aspects, this analysis can be conducted by a natural language process, such as spaCY or Sentence-BERT, where an embedding representation for the sentence can be compared to embedding representations for the phrases or a cosine similarity can be computed between them, to predict the similarity of the phrases to the sentence. The phrase identified as most similar to the sentence closest to the centroid can be chosen as the label of the cluster, similar to the theme of the textual data within the cluster. In an aspect, to reduce label overlap, only those labels that have not yet been chosen will be used.

In other aspects, this analysis can be conducted by determining a score for the phrases within a particular cluster and ranking the phrases based on the score. The score can be determined based on an algorithm that considers various factors, such as the length of the phrase, how words are covered in the particular cluster, and the scaled distance from the embedding representation of the phrase to the centroid of the cluster. Then, with the phrases being ranked based on the score, a predetermined number of the highest scoring phrases can be selected. From these top selections, a word overlap analysis can be conducted to determine words that are common to the top selections. These overlap words can be chosen as the label of the cluster. For example, if the predetermined number is three, and the top phrases are (1) "have to transfer your points to priority pass priority", (2) "like to transfer their delta points", and (3) "you request the products transfer", "transfer points" can be chosen as the label of the cluster.

In embodiments, graphics module 250 can generate a graphical user interface of the clusters and hierarchy from phrase clustering module 240. Graphics module 250 can be or include one or more servers, services, databases, and/or a combination thereof. Graphics module 250 can be implemented on a server computer, virtual machine, container, cloud-computing platform, or other device. Graphics module 250 can be implemented on a desktop computer, laptop, tablet, smartphone, or other device. Graphics module 250 can be further understood with reference to FIG. 7.

Textual data storage 210, text cleansing module 220, text extraction module 230, phrase clustering module 240, and graphics module 250 can interface with one another through one or more communications channels. The one or more communications channels can be wired, wireless, or a combination thereof. The one or more communications channels can include any combination of Local Area Networks, Wide Area Networks, the Internet, etc. Control logic or data can be transmitted to and from each entity via the one or more communications channels.

Figure 3:
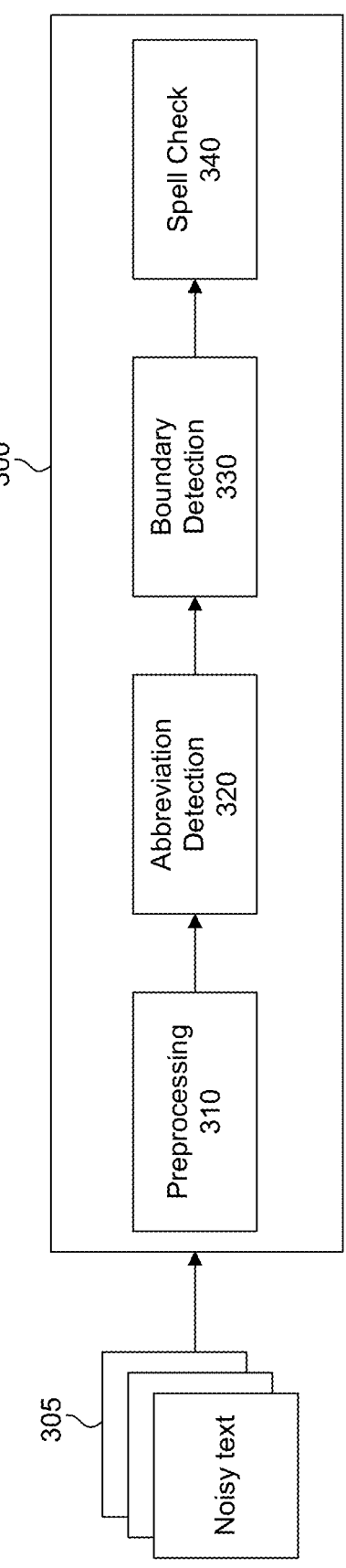
FIG. 3 illustrates a block diagram of an exemplary text cleansing module according to embodiments of the present disclosure.

FIG. 3 illustrates a block diagram of an exemplary text cleansing module 300 according to embodiments of the present disclosure. As shown in FIG. 3, the text cleansing module 300 includes a preprocessing block 310, an abbreviation detection block 320, a boundary detection block 330, and a sell check block 340, and may represent an exemplary embodiment of text cleansing module 220. In embodiments, the text cleansing module 300 may be implemented on one or more processors and/or circuits.

In an embodiment, the text cleansing module 300 receives text-based inputs. As discussed above, if customer feedback is received in another form, such as audio, there may be an initial step prior to input where that feedback is converted to text. This can be done, for example, using natural language processing, or other speech recognition processing. In an embodiment, the text input can be in the form of noisy text 305.

The noisy text 305 input is received at preprocessing block 310. The preprocessing block 310 is responsible for performing numerous initial operations on the received text in order to prepare the text for further operation. In embodiments, the preprocessing block 310 performs one or more of language detection, non-ASCII removal, shorthand/contraction expansion, number removal, multiple-space conversion, name/punctuation removal, stopword removal, and/or lemmatization, which are described in further detail below.

As discussed above, the preprocessing block 310 may perform language detection. This includes determining a language used in the feedback, including English, Spanish, or others. In order to carry this out, preprocessing block 310 may use an external library cld2 based on Naïve bayes classifier, which is a supervised machine learning algorithm configured to estimate a current language based on previous examples.

Preprocessing block 310 may also perform non-ASCII removal, in which non-ASCII characters are removed from the feedback. ASCII is commonly understood as the most common character encoding format for text data in computers and on the Internet. By removing non-ASCII characters from the text, the text can be refined to an analyzeable state. This can be carried out using built-in Python functions to check the Unicode code of received characters within the feedback.

Preprocessing block 310 may also perform contraction expansion to convert common contractions within the identified language to expanded forms. In an embodiment, this can include changing "won't" to "will not," or "doesn't" to "does not," etc.

Preprocessing block 310 may also perform number removal. In some instances, numbers will simply be removed. However, in other scenarios, numbers can be converted to their word forms. This may include, for example, converting "4" to "four," or "13" to "thirteen". In some embodiments, larger numbers are either simply removed or are not converted.

Preprocessing block 310 may also perform multiple space conversion, in which the preprocessing 310 removes extra spaces from the feedback in order to simplify the text. Preprocessing block 310 may also remove names or punctuations from the feedback. This can include removing proper names of places or people, as well as remove punctuation. In an embodiment, only intermediate punctuation, such as commas, semicolons, etc. are removed, while final punctuation (e.g., ".", "!", or "?") are left intact.

In embodiments, the preprocessing block 310 also removes stopwords from the feedback. Stopwords are essentially commonly used words in any language that are used to connect the information pieces of a sentence. These may include words, such as "a," "the," "when," "to," etc. To provide an example, in a feedback text containing the text "I am trying to talk to a customer service representative," the words "am," "to," "I," and "a." In this example, those words would be removed from the received text by the preprocessing block 310 during a stopword removal step.

In an embodiment, the preprocessing block 310 may also perform lemmatization. Lemmatization refers to the process of modifying words to remove inflectional endings only and to return the base or dictionary form of a word, which is known as the lemma. Thus, this process includes converting words to their lemmatized forms. To provide an example, the words car, cars, car's, and cars' may all be lemmatized to "car." Meanwhile, the words "am," "are," and "is" may all be lemmatized to the word "be." Thus, a phrase that reads "the boy's cars are different colors" may be lemmatized to read "the boy car be differ color."

Once the preprocessing block 310 has conclude its operations, the preprocessed text is forwarded to abbreviation detection block 320. In an embodiment, the abbreviation detection block 320 is configured to perform shorthand expansion and ambiguous abbreviation detection and replacement.

Oftentimes, customers will shorthand their feedback. Thus, rather than completely spelling out each individual word, they will often use unofficial and/or colloquial shorthand. In order to analyze this language, the intended expansion must first be identified. Therefore, the abbreviation detection block 320 performs shorthand expansion. In an embodiment, this includes looking up each misspelled word in a dictionary to try to find its correction expansion. In an embodiment, this is performed for both colloquial shorthands as well as company-specific shorthands used by the reviewing company. There may be a separate dictionary for company-specific shorthands.

In an embodiment, these operations may also include converting ambiguous abbreviations. In this embodiment, machine learning can be used to convert ambiguous abbreviations to either correct abbreviations before converting to expanded forms, or to a best guess expanded form directly. In an embodiment, common acronyms are not expanded. Examples of this may include "WiFi," or "LAN," etc.

The abbreviation detection block 320 forwards the resulting text to the boundary detection block 330. Boundary detection block 330 is configured to perform merging and/or splitting of words. In an embodiment, the merging of words may include combining two separate words that are separated by an erroneous space. An example may include converting "cra mped" to "cramped." Likewise, splitting of words separates two words that are erroneously combined by a lack of a space. An example of this may convert "awaitingreply" to "awaiting reply".

Following boundary detection, the boundary detection block 330 forwards the resulting text to the spellcheck block 340. Fundamentally, the spellcheck block 340 is configured to correct misspelled words. However, according to embodiments of this disclosure, this is performed in a very deep and iterative manner, as described below.

In an embodiment of the present disclosure, the spellcheck block 340 uses three steps to perform spellcheck on the received text. First, the spellcheck block 340 creates a wordlist of correct English words. For this, multiple words lists are used from online sources along with a Natural Language Toolkit (NLTK) word lists. Second, the spellcheck block 340 performs candidate generation for misspelled words. This process may include, for each misspelled word, generating a set of words that are at an edit distance of {1,2} from the misspelled word. This resulting dataset will be filtered based on whether they are present in the received text and/or historical data. Third, the correct word is selected from the candidate set. In order to make this selection, the spellcheck block 340 examines the word frequency of the and no noun definitions. If either of these words have a higher frequency count than the word "absent," then those words can be merged according to the above.

As illustrated in Table 1, below, customer feedback (e.g., "original text") listed below may be converted into "cleansed text" in the rightmost column when cleansed according to the above description.

TABLE 1

| Original Text | Cleansed Text + Stopword Removal |
|---|---|
| Per CM; 'Sam is trying to get through to Centurion viaphone and yet again you're experiencing unusually high call volumes'. 'Finally got thru to a human after 10 mins on hold- abysmal servic€'. | per card member <name> centurion phone experience unusually high volume finally human min hold abysmal service |
| AMF CL sd she's requested for 2 employee new card application twice already andnot recieved cards yet. Discussed a/c with new accounts team; was advised need some additional info to process application; advsd CM the same dt to new new accounts. | account manager request employee card application receive card discuss account account process application card member account. | candidates in the received text, and/or a Jaro Winkler distance (e.g., an edit distance between the misspelled word and the resulting candidate).

To provide an example of the above, the received text may include a misspelled word "amyour". Within the permissible edit distance, the top-K candidates include "am your," "amy our," "your," "mayor," and "armour." With this list of candidates, the spellcheck block 340 examines each for their frequency of use and their Jaro Winkley distance, and may identify "am your" as the correct spelling within the context of the received text.

In an embodiment, the spellcheck block 340 may also perform disemvoweling. Disemvoweling refers to a processing of removing vowels from words under analysis. This may convert, for example, "cars" to "crs", "captured" to "cptrd", or "guaranteed" to "grntd." In an embodiment, this process is performed specifically on words that cannot be successfully identified within the assigned edit distance. To resolve this, the text cleansing module 300 may create a list of correctly spelled words from historical customer feedback data, and vowels are removed from it to obtain their disemvoweled forms. Words are then removed that have the same disemvoweled forms to avoid misidentification.

Iteratively, the spellcheck block 340 may also perform concept merging. Specifically, in an embodiment, the spellcheck block 340 carries out this operation in order to resolve and merge similar words. In an embodiment, WordNet along with POS tags are used to carry out this function.

To perform this concept merging, the spellcheck block 340 finds, for each unique word in the received text, its synonyms using WordNet that has the same POS tag as the word in the text. Subsequently, the synonyms are ranked based on a WUP score (Wu & Palmer relatedness score) and frequency count to obtain the top-k similar words. Then, using FinBert, the spellcheck block 340 obtains word embeddings of the words and calculates a cosine distance between the initial word under analysis and the candidates. If the cosine distance greater than 0.7, the words can be merged with the word with a higher frequency count. To provide an example, received text may include the word "absent." According to WordNet with POS, "absent" has two adjective definitions, including "deficient" and "lacking"

Figure 4:
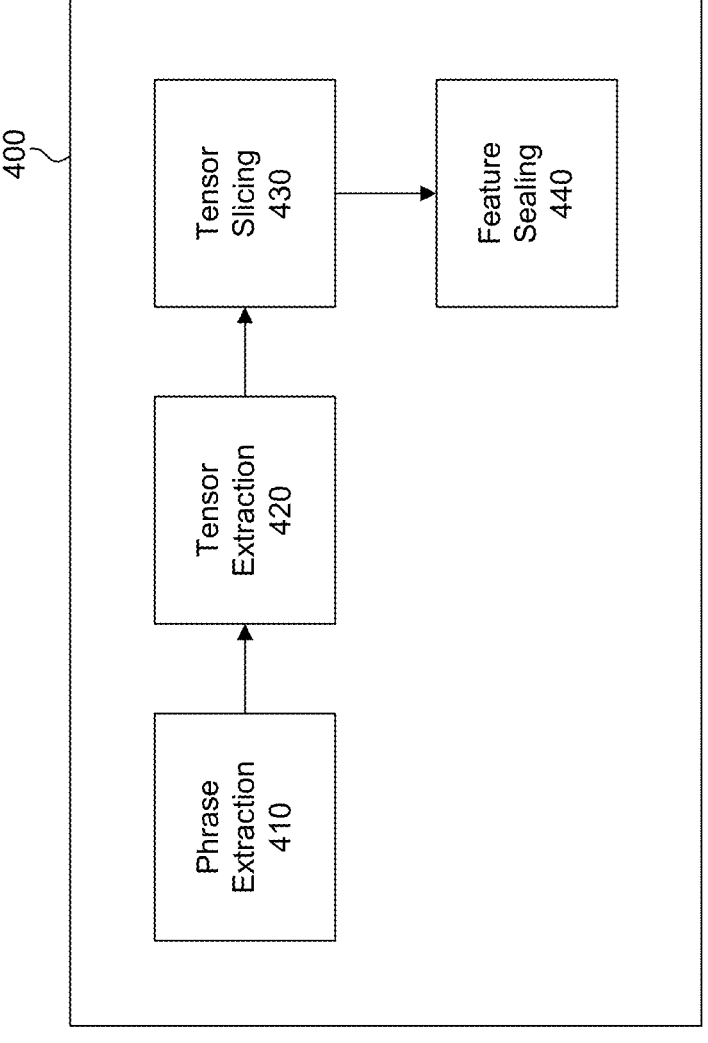
FIG. 4 illustrates a block diagram of an exemplary phrase representation service according to embodiments of the present disclosure.

FIG. 4 illustrates a block diagram of an exemplary phrase representation service 400 according to embodiments of the present disclosure. As shown in FIG. 4, the phrase representation service 400 includes phrase extraction 410, tensor extraction 420, tensor slicing 430, and feature scaling 440, and may represent an exemplary embodiment of phrase representation service 242. In an embodiment, the phrase representation service 400 is carried out by one or more processors and/or circuits.

The phrase extraction 410 is configured to extract a phrase from the received text feedback. In an embodiment, this can include selecting a text string from among the received text that is separated from other text strings by one or more punctuation elements, or can include a string of text that includes certain forms of speech, such as a verb, one or more nouns, etc.

The resulting phrase is then sent to the tensor extraction 420. The tensor extraction 420 breaks the received phrase down into component parts. Certain shorthands and/or abbreviations can be separated by some placeholder stem (e.g. " "##" in the below example).

From this resulting tensor list, tensor slicing 430 performs slicing of the received tensor list to remove extraneous words. In an embodiment, this can be performed using a sentence transformer/word model to transform the sentence. Essentially, this reduces the extracted sentence or phase down to its most basic meaning by extracting only the key words or elements necessary to understand the phrase's meaning.

To provide an example, the phrase extraction receives a full text feedback entry. From that entry, the phrase extraction 410 extracts the phrase "not appeal rn, was upset with rla. was looking for house hence." This is then passed to the tensor extraction 420, which produces a tensor set as follows: ['not', 'appeal', 'r', '##n', ',', 'was', 'upset', 'with', 'r', '##la', '.', 'was', 'looking', 'for', 'house', 'hence']. This tensor list is then provided to the tensor slicing 430. Tensor slicing then reduces this tensor list down to the following: ['was', 'upset', 'with', 'r', ' ##la']. By only analyzing the final slice of the original phrase, the context of the phrase can better be captured. In embodiments, normalization followed by Principal Component Analysis (PCA) is performed to reduce the embedding dimensions.

Once the final slice is obtained from the tensor slicing 430, the result is forwarded to feature scaling 440. In an embodiment, feature scaling 440 is configured to suppress certain words, like stopwords or company-specific redundant words, and other important words are boosted. In order to suppress a word, the embedding of the word of interest is multiplied by a factor <1. In order to maintain the sum of the embeddings, the original embedding of the phrase is multiplied by a reciprocal factor >1. Likewise, in order to boost a particular word, the embedding of the word of interest is multiplied by a factor >1 and the original embedding of the phrase is multiplied by a factor <1 to maintain the sum of the embeddings.

In the above example, it may be desirable to suppress the word "was" while boosting the word "rla" from the sliced tensor set ['was', 'upset', 'with', 'r', '##la']. In this example, the embeddings of these words may be scaled as follows:

[0.8234, 0.1723, 0.6221 . . . ]
[0.1673, 0.8114, 0.8911 . . . ]*alpha
[0.0297, 0.2356, 0.9783 . . . ]
[0.9079, 0.8003, 0.7490 . . . ]*beta
[0.5562, 0.7212, 0.6984 . . . ]*beta, where alpha is less than 1, and beta is greater than 1.

Once the phrases have been extracted, simplified, and scaled, as discussed above, the resulting phrases are provided to the phrase clustering service 244.

Phrase clustering is the process of performing level-wise clustering devices over the embeddings to cluster similar phrases together. According to embodiments of the present disclosure, the phrase clustering service 244 carries out this process by performing a series of steps. In an embodiment, the embedding of phrases over the sample data selected by the user is used to cluster the phrases together. For an initial cluster, Kmeans clustering is performed on all of the phrases. As is well-known, Kmeans clustering is a relatively simple unsupervised machine learning algorithm of vector quantization that aims to partition n observations into k clusters in which each observation belongs to the cluster with the nearest mean (cluster centers or cluster centroid), serving as a prototype of the cluster. In embodiments, the value of K (e.g., number of clusters) is decided as a function of the initial number of feedback entries to be clustered.

For the K clusters, a modified community detection algorithm is performed. Specifically, based on the embedding's cosine similarity of all pairwise combinations, similar sentence communities are discovered. In an embodiment, the similarity threshold is taken as a linear function between an upper and lower limit threshold. Additionally, in embodiments, overlapping communities are removed, giving preference to the size of the community. In other words, smaller communities that overlap with larger communities are absorbed into the larger communities. Then only communities that are larger than a predetermined minimum threshold are taken for analysis. These steps are then repeated a predetermined number of times for each of the community results. This is illustrated, for example, in FIG. 5.

Figure 5:
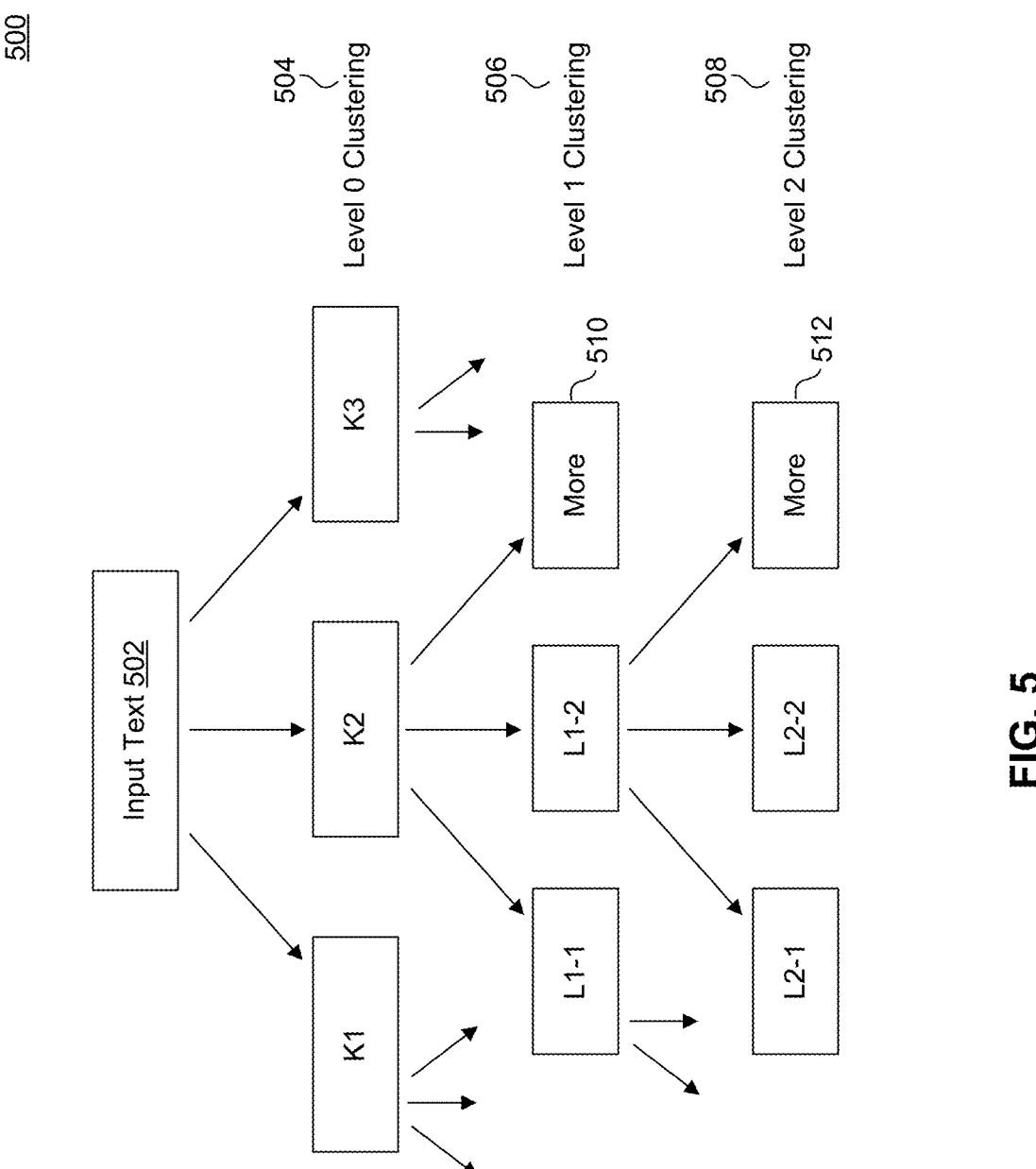
FIG. 5 illustrates a diagram of an exemplary K-clustering result according to embodiments of the present disclosure.

FIG. 5 illustrates a diagram of an exemplary K-clustering result according to embodiments of the present disclosure. As shown in FIG. 5, input text 502 is received. The phase clustering 500 performs level-0 clustering 504 on the received input text. In the example of FIG. 5, the phase clustering 500 arrives at three communities K1, K2, and K3 from the level-0 clustering operation. For each of the K clusters, this operation is performed again as level-1 clustering 506. Although each of clusters K1, K2, and K3 will have distinct results, only the results for cluster K2 are illustrated in FIG. 5.

As shown in FIG. 5, the level-1 clustering operation 506 on cluster K2 produces level-1 clusters L1-1, L1-2, and more 510. In the example of FIG. 5, clusters L1-1 and L1-2 are the largest of the level-1 clusters, whereas more 510 represents subsequent smaller level-1 clusters. As a result of the level-1 clustering operation 506, each of the level-0 clusters K1, K2, and K3 will have a subset of level-1 clusters associated with them. A level-2 clustering operation 508 can then be performed on each of the level-1 clusters. In an embodiment, the level-2 clustering operation 508 is only performed on the level-1 clusters that meet a certain size threshold (e.g., L1-1 and L1-2 in the example of FIG. 5).

The level-2 clustering operation 508 produces level-2 clusters for each of the level-1 clusters. As shown in FIG. 5, the level-2 clusters associated with level-1 cluster L1-2 include clusters L2-1, L2-2, and more 512. In the example of FIG. 5, clusters L2-1 and L2-2 are the largest of the level-2 clusters, whereas more 512 represents subsequent smaller level-2 clusters. This can be further repeated for subsequent levels to obtain additional levels of granularity. For purposes of this application, clustering is performed up to and including level-2 clustering operation 508. This may also provide a hierarchy of themes and/or granularity for the extracted and clustered themes.

Figure 6:
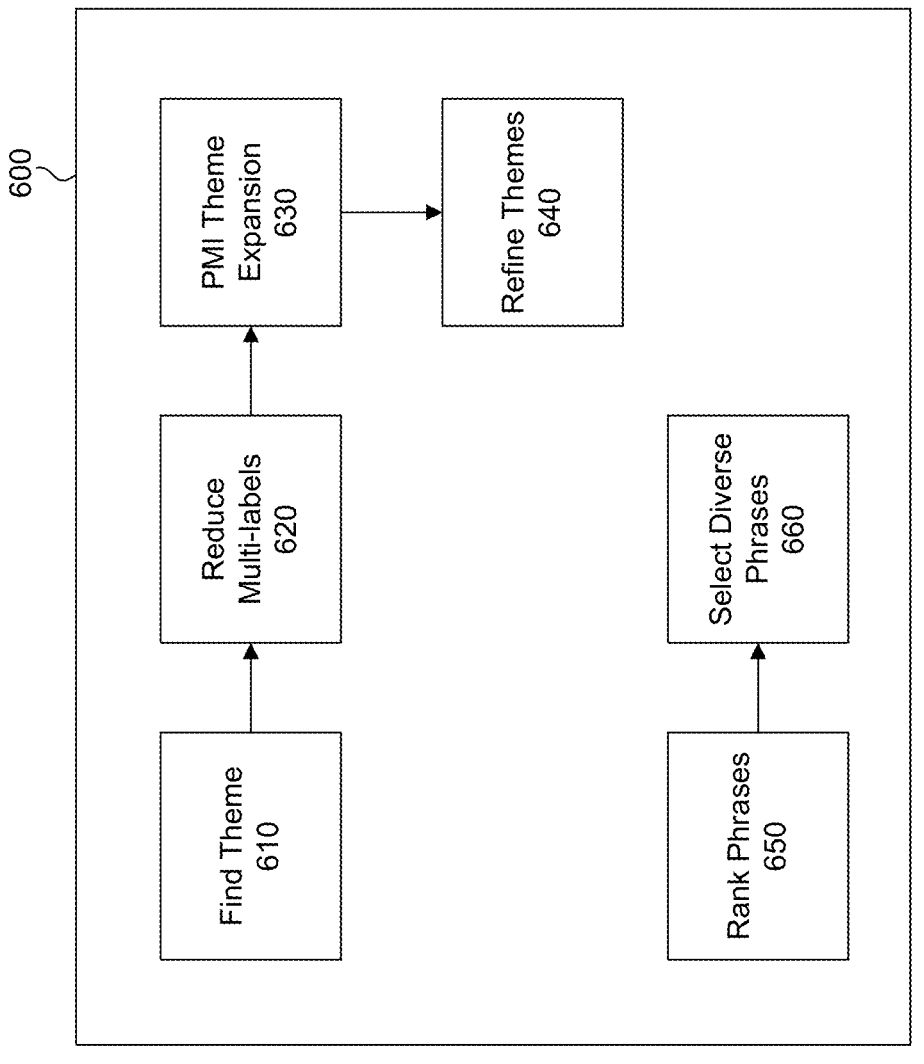
FIG. 6 illustrates a block diagram of an exemplary cluster labeling service according to embodiments of the present disclosure.

The results of the phrase clustering service 244 are forwarded to the cluster labeling service 246. FIG. 6 illustrates a block diagram of an exemplary cluster labeling service 600 according to embodiments of the present disclosure. As shown in FIG. 6, the cluster labeling service 246 includes a find theme block 610, a reduce multi-labels block 620, a pointwise mutual information (PMI) theme expansion block 630, a refine themes block 640, a rank phrases block 650, and a select diverse phrases block 660, and may represent an exemplary embodiment of cluster labeling service 246. In embodiments, the cluster labeling service 246 is executed by one or more processors.

In an embodiment, the cluster labeling service 600 receives as inputs, phrases, cluster centroids, phrase embeddings, and/or global term frequencies for unigrams (e.g., single words) and bi-grams (e.g., two consecutive words). The purpose of the cluster labeling service 600 is to label a cluster with 2-3 words that summarize the major information included therein.

To this end, the find theme block 610 selects a cluster label candidate based on a distance of ngrams from the cluster centroid. Based on this distance, the top (e.g., nearest) X ngrams are selected to be cluster label candidates. An ngram embedding is then computed using a sentence Transformer model, and a similarity is calculated with the cluster centroid. In an embodiment, the find theme block 610 does not consider labels which have high frequency (e.g., low IDF). Additionally, certain POS tags are not considered (e.g., determinants).

The find theme block 610 forwards its results to the reduce multi-labels block 620. The reduce multi-labels block 620 drops certain labels in order to avoid multiple labels from a single cluster. For example, if super label B is significantly less than super label A or if the intersection of A & B is high, then super label B is dropped. The reduce multi-labels block 620 forwards the results to the PMI theme expansion block 630.

The PMI theme expansion 630 is used to expand super labels by adding more context to the super labels by taking PMI (pointwise mutual information), coverage, etc. into consideration. In an embodiment, a them is expanded if it has an associated bigram and trigram (e.g., three consecutive words) associated with it.

In the refine themes block 640, redundant information in the theme labels is reduced. In an embodiment, when a unigram and a bigram within a cluster have word overlap, the bigram is given preference. In an example, the refine themes block 640 detects a bigram "credit limit" and a unigram "limit." In this example, the unigram is converted into the bigram, thus resulting in "limit" being converted to "credit limit."

Separately, the rank phrases block 650 and the select diverse phrases 660 operate on the received phrases. In particular, the rank phrases block 650 receives the top phrases and determines a consolidated score to rank the phrases based on various factors of importance. In an embodiment, the factors include phrase length, coverage of words in the same cluster, scaled distance from the centroid, and phrase theme overlap, among others.

The select diverse phrases block 660 receives the ranked phrases from the rank phrases block 650. The select diverse phrases block 660 then selects, from among the top phrases of the ranked list, a top X combinations based on the word overlap among the different phrases. In an embodiment, X is 3.

Table 2, below, illustrates an example of clustering a portion of text into clusters in a hierarchy and labeling the clusters in the hierarchy, according to some aspects of the present disclosure. As shown in Table 2, the text processing system 200 can create and label the clusters in the hierarchy using cluster labeling service 246 of phrase clustering module 240, as described with reference to FIGS. 2, 4, and 6. As shown, textual data can be a summary of a simplified text generated by text cleansing module 220 and text extraction module 230. Textual data can be represented as an embedding by phrase representation service 242 of phrase clustering module 240.

L0, L1, and L2). Then, cluster labeling service 246 of phrase clustering module 240 can provide labels for the themes of each cluster. For example, L0_Label can be a label identified for a k-cluster. L1_Labels can be labels identified for clusters generated from a community detection algorithm. As shown, L1_Labels can be more specific than L0_Label. L2_Labels can also be labels identified for clusters generated from a second community detection algorithm. As shown, L2_Labels can be more specific than both L0_Label and L1_Labels. In this way, a three level hierarchy of clusters can be formed, such as shown in FIG. 5, where each level of the hierarchy provides more detailed labels for the textual data within the hierarchy. The hierarchy may correspond to a hierarchy of themes extracted from the text. Phrase clustering module 240 can also be configured to generate a count of phrases or sentences of the textual data that fall within each cluster of the hierarchy. For example, as shown, count illustrates the count of phrases or sentences that fall within respective clusters of L2_Labels of the hierarchy.

Figure 7:
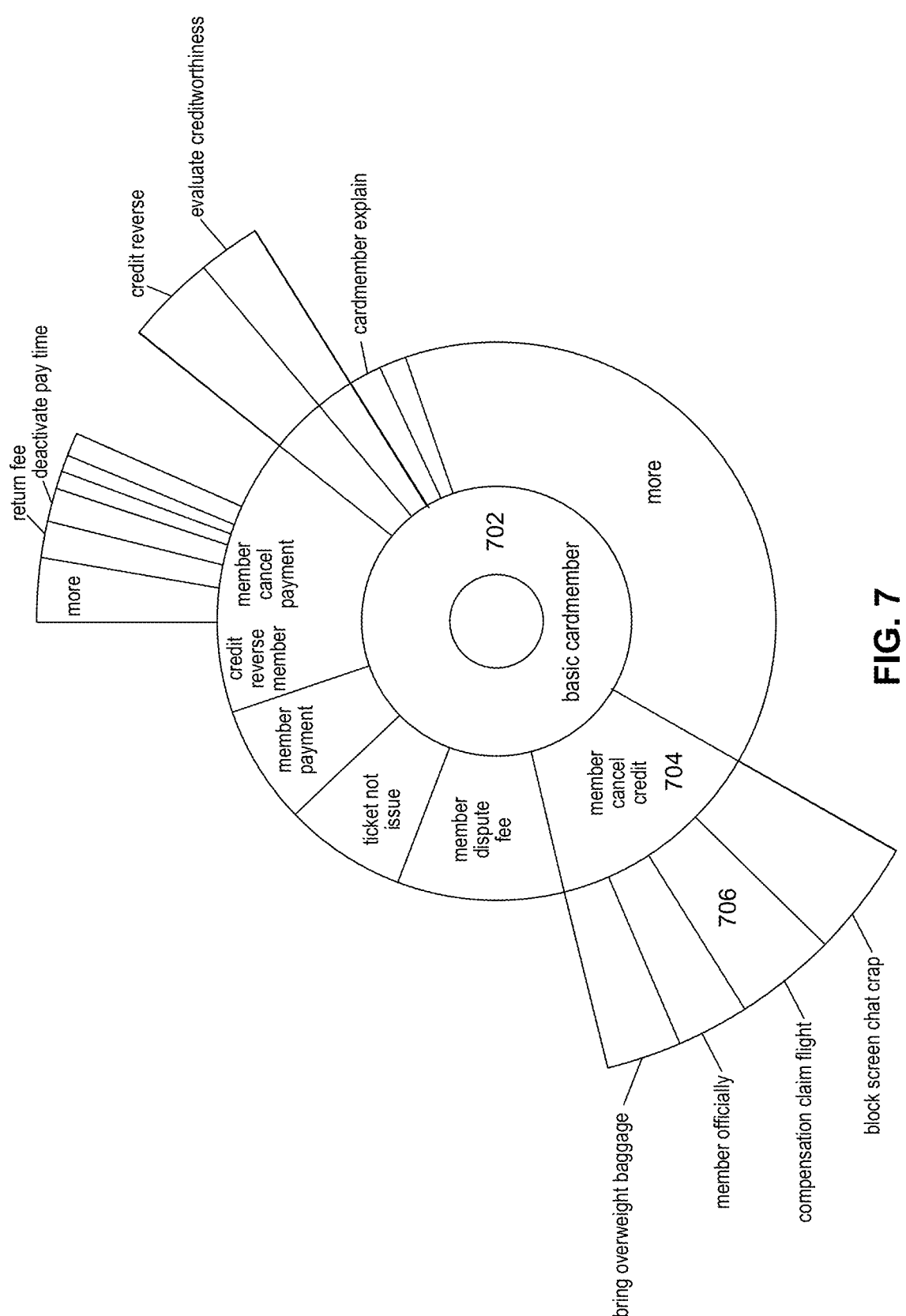
FIG. 7 illustrates an exemplary graphical user interface (GUI) showing extracted themes from textual data in the form of clusters and a hierarchy, according to embodiments of the present disclosure.

FIG. 7 illustrates an exemplary graphical user interface (GUI) 700 showing extracted themes from textual data in the form of clusters and a hierarchy, according to some aspects of the present disclosure. In embodiments, GUI 700 can be generated by graphics module 250, as described with reference to FIG. 2. As shown, GUI 700 represents a hierarchy similar to that shown in FIG. 5. After processing an input textual data, level 702 is the highest level in the hierarchy, containing one or more clusters and corresponding cluster labels. For example, level 702 can be a level representing k-clusters. Each cluster in GUI 700 is depicted as a portion of a hollow cylinder. Each cluster in GUI 700 is sized based on the count of phrases or sentences from the input textual data that fall within the respective cluster. Level 704 can be a lower level in the hierarchy, containing additional clusters and corresponding labels. For example, level 704 can be a level representing outputs from a community detection

TABLE 2

| Summary of Textual Data | L0_Label | L1_Labels | L2_Labels | Count |
|---|---|---|---|---|
| There is going to be the same standard information to verify service member active duty status with the department of defense. dbranch prop hbs wants to know if you are serving on active duty or are you the or of an active duty | ['verify the service members active duty status', 'department of defense needs this information'] | ['a system to verify your active duty status', 'department of defense'] | ['verify the service members active duty status', 'department of defense', 'must ask for the following information'] | 40 |
| | | | ['on active duty'] | 34 |
| there is no active duty reporting or start date available for you. | | | ['duty reporting start date', 'available'] | 28 |
| there is no application for you being an active duty | | | ['duty member', 'request something'] | 12 |
| the start date for the active duty is the date when the service starts. | | ['the active duty start date available,' 'duty reporting date'] | ['says active duty reporting days', 'reporting your start date'] | 39 |
| it's the date of birth, social security number and active duty start if it's available | | | ['the date of birth is the date', 'reported active duty'] | 8 |

Phrase clustering service 244 of phrase clustering module 240 can then be used to generate clusters of similar textual data found in different levels of a clustering hierarchy (e.g., algorithm performed on the outputs of level 702. Level 704 can contain more detailed clusters and labels than that of level 702. Level 706 can be an even lower level in the hierarchy containing a larger number of clusters and corresponding levels. Level 706 can be a level representing outputs from a second community detection algorithm performed on the outputs of level 704. Level 706 can contain more detailed clusters and labels than that of level 704. GUI 700 allows a user to see the number of processes performed on a textual data (i.e., number of layers in the hierarchy), the number of clusters in each layer (i.e., number of categories of similar phrases or sentences for the textual data), labels for each cluster (i.e., themes, of varying detail, for the categories of textual data) and a visual representation of the count of phrases or sentences within each cluster of each layer (i.e., frequency of themes).

Figure 8:
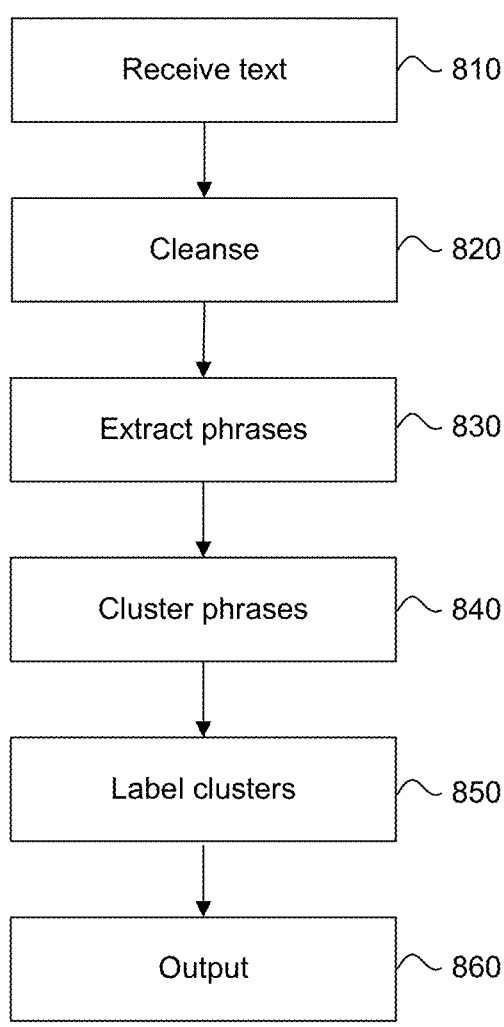
FIG. 8 illustrates a flowchart diagram of an exemplary method for summarizing customer feedback according to embodiments of the present disclosure.

FIG. 8 illustrates a flowchart diagram of an exemplary method 800 for summarizing customer feedback according to embodiments of the present disclosure. As shown in FIG. 8, the method 800 begins by the system receiving text in step 810. In embodiments, the text may have been received from a customer over a web interface, entered directly by the customer. In other embodiments, the text may have been converted from speech or other feedback input into a text format for review purposes. It should be understood that, while the specification is described in terms of customer feedback, this application is equally applicable to other notes or feedback, such as comments from employees or agent notes.

In step 820, the text is cleansed. In embodiments, the cleansing can include any number of cleansing processes, including but not limited to, language detection, non-ASCII removal, shorthand/contraction expansion, ambiguous abbreviation correction, merging/splitting of words, spell-checking, concept merging, lemmatization, removing URLs or other computer-related language, disemvoweling, etc.

In step 830, phrases are extracted from the cleansed text. Text typically contains a mixture of themes, with a lot of redundant information. The objective of this step is to extract a relevant portion of that text which captures the essence and major topic areas of included in the text. In an embodiment, relevant phrases from the text are extracted using a BART text summarizer, and then sentences extracted from the model are taken as individual phrases.

In step 840, the extracted phrases are clustered. In an embodiment, the phrase clustering includes a phrase representation substep and a phrase clustering substep. In the phrase representation, a phrase is reduced to its embedding representations. For example, a complete sentence is received, the embeddings of the complete sentence are extracted using a sentence transformer model, and then only the slice of the phrase is taken into consideration. Normalization can also be performed following a principal component analysis to reduce the embedding dimensions. The clusters can then be labeled, as described above with respect to FIG. 5.

In step 850, the clusters are labeled. In an embodiment, the labeling includes finding a theme based on a centroid embedding of the cluster, frequency of words, an across-cluster metric, and POS tag filtering. Multi-labels are then reduces, and PMI theme expansion is performed as discussed in further detail above. The themes are then refined by reducing theme label overlap. In an embodiment, the labeling also includes ranking phrases based on phrase length, word coverage, distance from a centroid, and phrase theme overlap, and then selecting diverse phrases from among the results.

In step 860, the resulting themes and labels are output to a user. In an embodiment, this output can be in the form of a graphical user interface, such as that shown in FIG. 7. As shown in FIG. 7, in embodiments, GUI 700 represents a hierarchy similar to that shown in FIG. 5. After processing an input textual data, level 702 is the highest level in the hierarchy, containing one or more clusters and corresponding cluster labels. For example, level 702 can be a level representing k-clusters. Each cluster in GUI 700 is depicted as a portion of a hollow cylinder. Each cluster in GUI 700 is sized based on the count of phrases or sentences from the input textual data that fall within the respective cluster. Level 704 can be a lower level in the hierarchy, containing additional clusters and corresponding labels. For example, level 704 can be a level representing outputs from a community detection algorithm performed on the outputs of level 702. Level 704 can contain more detailed clusters and labels than that of level 702. Level 706 can be an even lower level in the hierarchy containing a larger number of clusters and corresponding levels. Level 706 can be a level representing outputs from a second community detection algorithm performed on the outputs of level 704. Level 706 can contain more detailed clusters and labels than that of level 704. GUI 700 allows a user to see the number of processes performed on a textual data (i.e., number of layers in the hierarchy), the number of clusters in each layer (i.e., number of categories of similar phrases or sentences for the textual data), labels for each cluster (i.e., themes, of varying detail, for the categories of textual data) and a visual representation of the count of phrases or sentences within each cluster of each layer (i.e., frequency of themes).

Figure 9:
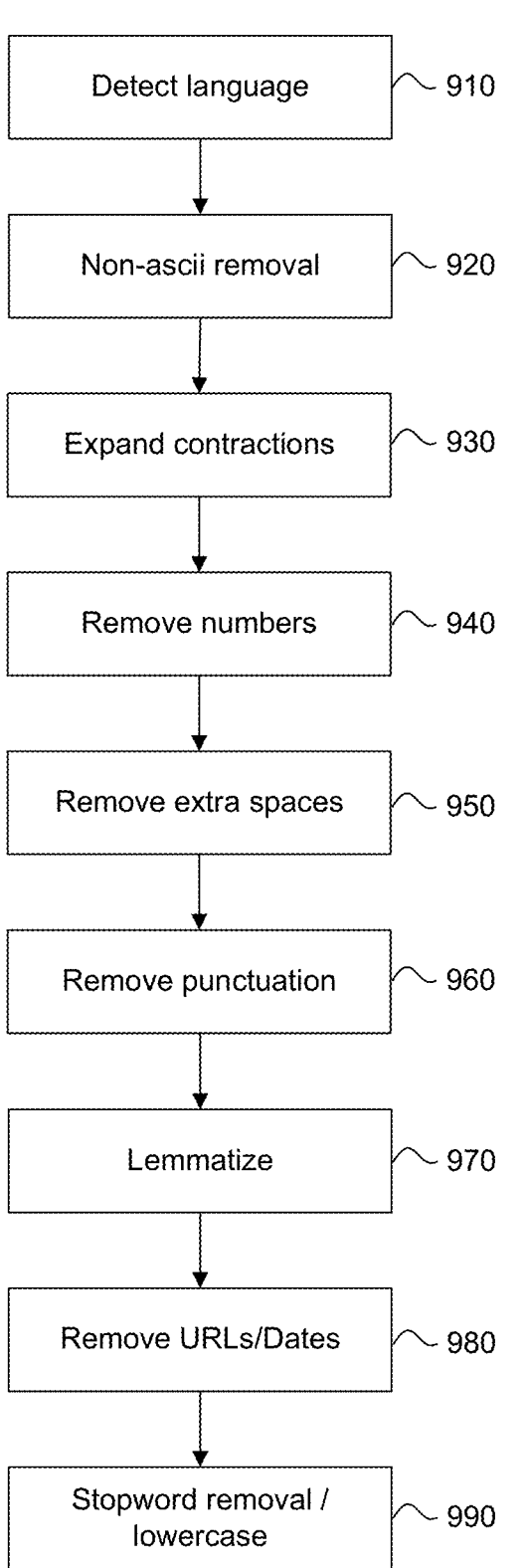
FIG. 9 illustrates a flowchart diagram of an exemplary method for cleansing received text according to embodiments of the present disclosure.

FIG. 9 illustrates a flowchart diagram of an exemplary method 900 for cleansing received text according to embodiments of the present disclosure.

The method begins in step 910, wherein the language used by the text is determined. In embodiments, this is carried out using an external library cld2 based on Naïve bayes classifier, which is a supervised machine learning algorithm configured to estimate a current language based on previous examples.

In step 920, non-ASCII characters are removed from the text. ASCII is commonly understood as the most common character encoding format for text data in computers and on the Internet. By removing non-ASCII characters from the text, the text can be refined to an analyzable state. This can be carried out using built-in Python functions to check the Unicode code of received characters within the feedback.

In step 930, contractions are expanded. In an embodiment, common contractions within the identified language are converted to expanded forms. To provide examples, this can include changing "won't" to "will not," or "doesn't" to "does not," etc.

In step 940, numbers are removed or converted to alphabetical characters. In some instances, numbers will simply be removed. However, in other scenarios, numbers can be converted to their word forms. This may include, for example, converting "4" to "four," or "13" to "thirteen". In some embodiments, larger numbers are either simply removed or are not converted.

In step 950, extra spaces are removed. This may include removing unnecessary spaces between sentences or words, and/or within individual words.

In step 960, punctuation and/or names are removed. In embodiments, this can include removing proper names of places or people, as well as remove punctuation. In an embodiment, only intermediate punctuation, such as commas, semicolons, etc. are removed, while final punctuation (e.g., ".", "!", or "?") are left intact.

In step 970, the text is lemmatized. Lemmatization refers to the process of modifying words to remove inflectional endings only and to return the base or dictionary form of a word, which is known as the lemma. Thus, this process includes converting words to their lemmatized forms. To provide an example, the words car, cars, car's, and cars' may all be lemmatized to "car." Meanwhile, the words "am," "are," and "is" may all be lemmatized to the word "be." Thus, a phrase that reads "the boy's cars are different colors" may be lemmatized to read "the boy car be differ color."

In step 980, dates, URLs, and other computer-based terms are removed. This can include removing any words, terms, or phrases that are not germane to the topic detection, including URLs, times, identifiers, etc.

In step 990, stopwords are removed and the text is converted to lowercase. Stopwords are essentially commonly used words in any language that are used to connect the information pieces of a sentence. These may include words, such as "a," "the," "when," "to," etc. To provide an example, in a feedback text containing the text "I am trying to talk to a customer service representative," the words "am," "to," "I," and "a." In this example, those words would be removed from the received text by the preprocessing block 310 during a stopword removal step.

It should be understood that, unless a later step relies on an earlier step for completion, the steps can be rearranged within the spirit and scope of the present disclosure. Also, the methods 800 and 900 described above can include more or fewer steps than those illustrated, which are provided as an example embodiment.

Figure 10:
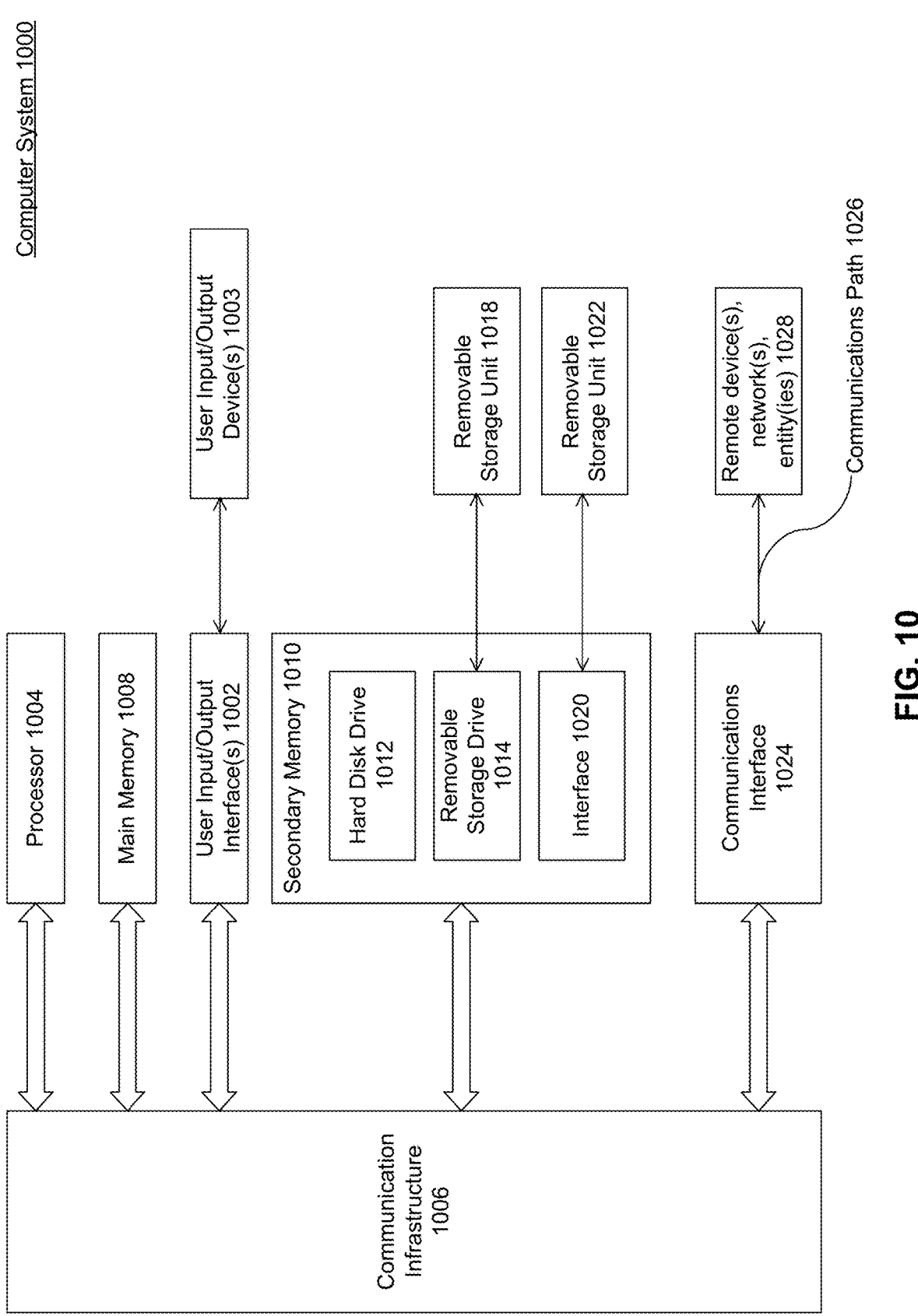
FIG. 10 illustrates a block diagram of an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A text processing system, comprising:

a memory that stores a text submission received from a user device; and one or more processors coupled to the memory and configured to:

receive the text submission from the memory;

cleanse the text submission into a simplified form by performing a spell check on the text submission, wherein to perform the spell check, the one or more processors are further configured to:

detect a misspelled word in the text submission;

create a wordlist of correct English words within a first predetermined edit distance of the misspelled word;

generate a plurality of candidates for the misspelled word within a second edit distance from the misspelled word;

filter the plurality of candidates based on whether the plurality of candidates are present in the text submission and based on historical data; and select a correct word from the plurality of candidates based on a frequency of use of the plurality of candidates in the text submission and a distance from the misspelled word;

extract, by a neural network, one or more phrases from the cleansed text submission, wherein the neural network is configured to generate a summary of the cleansed text submission based on analyzing each word in the cleansed text submission;

cluster, by a machine learning algorithm, the extracted phrases into a plurality of different clusters, wherein the plurality of different clusters form a hierarchy of themes extracted from the text submission and wherein the machine learning algorithm quantizes the extracted phrases to partition the extracted phrases into the plurality of different clusters based on a similarity between the extracted phrases;

label the plurality of different clusters to generate a plurality of labeled clusters; and generate a graphical user interface that visualizes the plurality of labeled clusters organized in the hierarchy of themes.

2. The text processing system of claim 1, wherein to cleanse the text submission, the one or more processors are further configured to:

detect a language of the text submission.

3. The text processing system of claim 1, wherein to cleanse the text submission, the one or more processors are further configured to:

remove non-ASCII characters, expand contractions, remove numbers, remove multiple spaces, remove names, remove punctuation, remove stopwords, and lemmatize the text submission.

4. The text processing system of claim 1, wherein to cleanse the text submission, the one or more processors are further configured to:

expand abbreviations and shorthand expressions.

5. The text processing system of claim 1, wherein to cleanse the text submission, the one or more processors are further configured to:

detect erroneously split words;

merge the erroneously split words;

detect erroneously combined words; and separate the erroneously combined words.

6. The text processing system of claim 1, wherein the distance from the misspelled word comprises a Jaro Winkler distance.

7. The system of claim 1, further comprising:

generate, for each of the extracted phrases, a phrase embedding, where the phrase embedding is a vector representing a relationship between the phrase and other phrases in vector space;

for each of the extracted phrases, extract one or more word embeddings, wherein the word embeddings are vectors representing words in vector space;

for each word embedding:

determine a word scaling factor, wherein the word scaling factor indicates an importance of the word embedding; and adjust the word embedding by the word scaling factor; and for each of the extracted phrases, adjust the phrase embedding by one or more phrase scaling factors, wherein each phrase scaling factor is reciprocal to each word scaling factor.

8. A method, comprising:

storing, by a memory, a text submission received from a user device;

cleansing, by a processor coupled to the memory, the text submission by performing a spell check on the text submission, the spell check comprises:

detecting a misspelled word in the text submission;

creating a wordlist of correct English words within a first predetermined edit distance of the misspelled word;

generating a plurality of candidates for the misspelled word within a second edit distance from the misspelled word;

filtering the plurality of candidates based on whether the plurality of candidates are present in the text submission and based on historical data; and selecting a correct word from the plurality of candidates based on a frequency of use of the plurality of candidates in the text submission and a distance from the misspelled word;

extracting, by the processor with a neural network, one or more phrases from the cleansed text submission, wherein the neural network is configured to generate a summary of the cleansed text submission based on analyzing each word in the cleansed text submission;

clustering, by the processor with a machine learning algorithm, the extracted phrases into a plurality of different clusters, wherein the plurality of different clusters form a hierarchy of themes extracted from the text submission and wherein the machine learning algorithm quantizes the extracted phrases to partition the extracted phrases into the plurality of different clusters based on a similarity between the extracted phrases;

labeling, by the processor, the plurality of different clusters to generate a plurality of labeled clusters; and generating, by the processor, a graphical user interface that visualizes the plurality of labeled clusters organized in the hierarchy of themes.

9. The method of claim 8, wherein the distance from the misspelled word comprises a Jaro Winkler distance.

10. The method of claim 8, wherein the clustering includes determining an embedding representation of sentences within a summary of the text submission, the embedding representation being a vector that encodes a meaning of a word, phrase, or sentence in such a way that other embeddings that are closer in the vector space are expected to be similar in meaning.

11. The method of claim 8, wherein the clustering further includes performing Kmeans clustering on all phrases included within the text submission to produce K level-0 clusters associated with the text submission.

12. The method of claim 11, wherein the clustering further includes, for each of a preset number of top level-0 clusters, performing a second clustering operation to arrive at a plurality of level-1 clusters.

13. A text processing system, comprising:

a memory that stores a text submission received from a user device;

an image output device configured to provide a graphical user interface to the user device; and one or more processors coupled to the memory and configured to:

receive the text submission from the memory;

cleanse the text submission into a simplified form by performing a spell check on the text submission, wherein to perform the spell check, the one or more processors are further configured to:

detect a misspelled word in the text submission;

create a wordlist of correct English words within a first predetermined edit distance of the misspelled word;

generate a plurality of candidates for the misspelled word within a second edit distance from the misspelled word;

filter the plurality of candidates based on whether the plurality of candidates are present in the text submission and based on historical data; and select a correct word from the plurality of candidates based on a frequency of use of the plurality of candidates in the text submission and a distance from the misspelled word;

extract, by a neural network, one or more phrases from the text submission, wherein the neural network is configured to generate a summary of the cleansed text submission based on analyzing each word in the cleansed text submission;

cluster, by a machine learning algorithm, the extracted phrases into a plurality of different clusters, wherein the plurality of different clusters form a hierarchy of themes extracted from the text submission and wherein the machine learning algorithm quantizes the extracted phrases to partition the extracted phrases into the plurality of different clusters based on a similarity between the extracted phrases; and generate the graphical user interface to include a visualization of the plurality of different clusters organized in the hierarchy of themes.

14. The text processing system of claim 13, wherein the one or more processors are further configured to label the plurality of different clusters.

15. The text processing system of claim 13, wherein the clustering includes determining an embedding representation of sentences within a summary of the text submission.

16. The text processing system of claim 15, wherein the embedding representation being a vector that encodes a meaning of a word, phrase, or sentence in such a way that other embeddings that are closer in the vector space are expected to be similar in meaning.

17. The text processing of claim 15, wherein the clustering further includes performing Kmeans clustering on all phrases included within the text submission to produce K level-0 clusters associated with the text submission.

18. The text processing system of claim 17, wherein the clustering further includes modified community detection that includes:

determining similar sentence communities; and removing overlapping communities.

19. The text processing system of claim 18, wherein similar sentence communities are identified based on a cosine similarity of multiple embeddings identified in the text submission, and wherein the removal of overlapping communities removes a smaller overlapping community in favor of a larger overlapping community.

\* \* \* \* \*